United States Patent [19]

Jagodzinski et al.

[11] 4,171,200
[45] Oct. 16, 1979

[54] PROCESS AND APPARATUS FOR IN SITU MELTING OF SULPHUR FROM SOLID SULPHUR STORAGE BLOCK

[75] Inventors: Richard F. Jagodzinski; Edward L. Wahl, both of Calgary, Canada

[73] Assignee: Hudson's Bay Oil and Gas Company Limited, Calgary, Canada

[21] Appl. No.: 846,833

[22] Filed: Oct. 31, 1977

[30] Foreign Application Priority Data

Nov. 15, 1976 [CA] Canada ............................. 265637

[51] Int. Cl.² ........................................... F27B 17/00
[52] U.S. Cl. ................... 432/13; 23/293 S; 299/3; 299/6; 432/224
[58] Field of Search ............ 432/13, 62, 210, 224, 432/225; 23/293 S; 299/3, 6

[56] References Cited

U.S. PATENT DOCUMENTS

| | | | |
|---|---|---|---|
| 2,515,136 | 7/1950 | Pigott | 432/13 |
| 2,994,589 | 8/1961 | Stolfa et al. | 23/293 S |

FOREIGN PATENT DOCUMENTS

| | | | |
|---|---|---|---|
| 762850 | 7/1967 | Canada | 432/266 |
| 769438 | 6/1975 | Canada | 432/266 |
| 992908 | 7/1976 | Canada | 432/266 |
| 590859 | 4/1959 | Italy | 299/6 |

OTHER PUBLICATIONS

"High Capacity Attained by New Sulphur Melter", Chemical and Metallurgical Eng., vol. 44, No. 8, Aug. 1937, Schwab et al.
"Canada Sulphur Production and Trade", by Pearse G.H.K. 1973, No. 47, (Mineral Development Sector, Department of Energy, Mines and Resources, Ottawa).

Primary Examiner—John J. Camby
Attorney, Agent, or Firm—Burns, Doane, Swecker & Mathis

[57] ABSTRACT

This invention relates to a method and apparatus for the in situ melting and removal of liquid sulphur from a solid sulphur storage block. The method comprises supplying heat to the storage block sufficient to melt the sulphur of the storage block to produce liquid sulphur, collecting the liquid sulphur and removing the liquid sulphur. The apparatus comprises heating means for heating and melting the sulphur storage block to produce liquid sulphur, means for collecting the liquid sulphur and means for removing the liquid sulphur from the collecting means.

18 Claims, 2 Drawing Figures

1

PROCESS AND APPARATUS FOR IN SITU MELTING OF SULPHUR FROM SOLID SULPHUR STORAGE BLOCK

BACKGROUND OF THE INVENTION

This invention relates to the recovery of sulphur from a free standing solid storage block of sulphur by a method and apparatus for the in situ melting of sulphur to produce liquid sulphur and collecting and removing the liquid sulphur from the block.

It is known that liquid sulphur is produced as a by-product of the processing of natural gas, for example, from the sweetening of sour gas. The liquid sulphur is usually poured into an area where it accumulates to form a free standing solid storage block or is preformed into some solid shapes prior to storage or transportation. Storage of sulphur in large solid blocks has been favoured over preformed storage in light of the increased initial expenditure required for the latter. Preforming involves large costs in equipment for processing and handling of the sulphur which often is stored for many years before being sold. Extended storage results in the physical deterioration of the preformed sulphur and continued loss of interest on the monies invested until the preformed sulphur is sold. The economy of storing sulphur in solid blocks is largely lost when, according to present methods, its recovery for shipping is attempted. The present methods of recovery of sulphur from solid storage blocks have utilized earth moving equipment for ripping the sulphur from the block and subsequent crushing and loading in solid form or remelting for shipment, as liquid. These methods are costly and, in addition, handling of the solid sulphur and particularly the size reduction operation produces dust to such a degree that severe ecological damage can result which is environmentally unacceptable or leads to additional expense in dust prevention and/or recovery. Attempts have been made to eliminate or reduce these disadvantages by various means but none have been considered successful.

SUMMARY OF THE INVENTION

The present invention seeks to eliminate or reduce the foregoing noted disadvantages by the removal of sulphur from a free standing solid storage block by the in situ remelting of the sulphur block or portion thereof to produce liquid sulphur, collecting the liquid sulphur and removing the liquid sulphur to be shipped directly as a liquid or preformed and shipped as a solid product.

In accordance with the present invention, a method for the in situ melting and recovery of sulphur from a free-standing solid block of stored sulphur having a generally flat base, comprises drilling a series of generally horizontal bores adjacent the base of the block and inserting a series of elongated heat exchange elements into these bores to provide generally a horizontal array of such elements. A weir is provided adjacent the base of the block in such position as to enable a layer of molten sulphur to be retained in contact with the heating elements, and heat is supplied to the elements to cause sulphur in contact therewith to melt and form this molten layer. Molten sulphur is removed from the weir at a rate sufficient to maintain the molten layer in contact with the heating elements.

The method of the invention also includes a method for storage and recovery of sulphur comprising the steps of pouring the molten sulphur onto a generally flat base area to form a free-standing storage block, and recovering the sulphur using the procedure set out above.

The heat exchange elements each have an inlet means and an outlet means in order to allow for the passage of heat in one form or another to the element. The heat passes from the element to the solid sulphur and thus melts the sulphur in the vicinity of each element, and the weir maintains a liquid pool around the heat exchange elements and ensures good heat transfer between these elements and the solid sulphur. The heat exchange elements are preferably arranged essentially parallel to each other and may be located at about the same height from the base of the block or they may be located at two or more different heights from the base of the block. Thus a group of several elements may be located at one height level and another group of elements may be located at a higher or lower level from the base of the block. The heat exchange elements may extend into the storage block for varying distances measured from the outer surface of the block.

The heat exchange elements used are generally fabricated from pipe or tubing and may be, for example, single pipe assemblies, U-shaped pipe assemblies or concentric pipe assemblies or multiple combinations thereof. The assemblies may be varied in length and/or in diameter in order to allow for varying the amount of heat transfer area.

The heat exchange elements, such as pipes, may be arranged in the sulphur storage block with a substantially equal center to center spacing or a variable center to center spacing between each pair of adjacent pipes or the pipes may be arranged with a mixture of equal center to center spacing between some pairs of adjacent pipes and variable center to center spacing between other pairs of adjacent pipes.

The heating elements in the form of pipes which can be either single, U-shaped or concentric pipes, may also be placed fully or partially into the block for substantially the same or different distances from the outer surface of the block in a substantially horizontal position and substantially parallel to each other and located at the same or different heights from the base of the block.

During operation of the method of the invention wherein heat is supplied to the block by means of heat transferred from the heat exchange elements, the elements may be heated by electric means or by the passage therethrough of fluid heat means such as gaseous heat means, for example, steam, or liquid heat means, for example heated oil or glycol.

The weir may be fabricated such that the outer surface of the block at and near to the base of the block may form part of the structure of the weir. Thus, the surface at and near to the base of the block may conveniently form one wall of the weir while the remaining walls of the weir are fabricated to form an enclosed structure alongside the base of the block. The weir may be fabricated to totally enclose the block.

The liquid sulphur is removed from the weir through an overflow pipe or conduit to a sulphur holding tank. If desired, the overflow pipe or conduit may be attached to the collecting means in such a manner that the liquid sulphur is confined and maintained at a specified level in the collecting means. Alternatively, in certain instances, it may be possible to have the holding tank formed as part of the collecting means. The liquid sulphur may then be pumped by a transfer line from the holding tank to railcars for shipment to an alternate liquid disposal facility.

While the specification concludes with claims which state distinctly and in explicit terms the subject matter of the present invention, preferred embodiments are described in the following detailed description which may best be understood when read in conjunction with the accompanying drawings.

DESCRIPTION OF THE PREFERRED EMBODIMENTS

Figure 1:
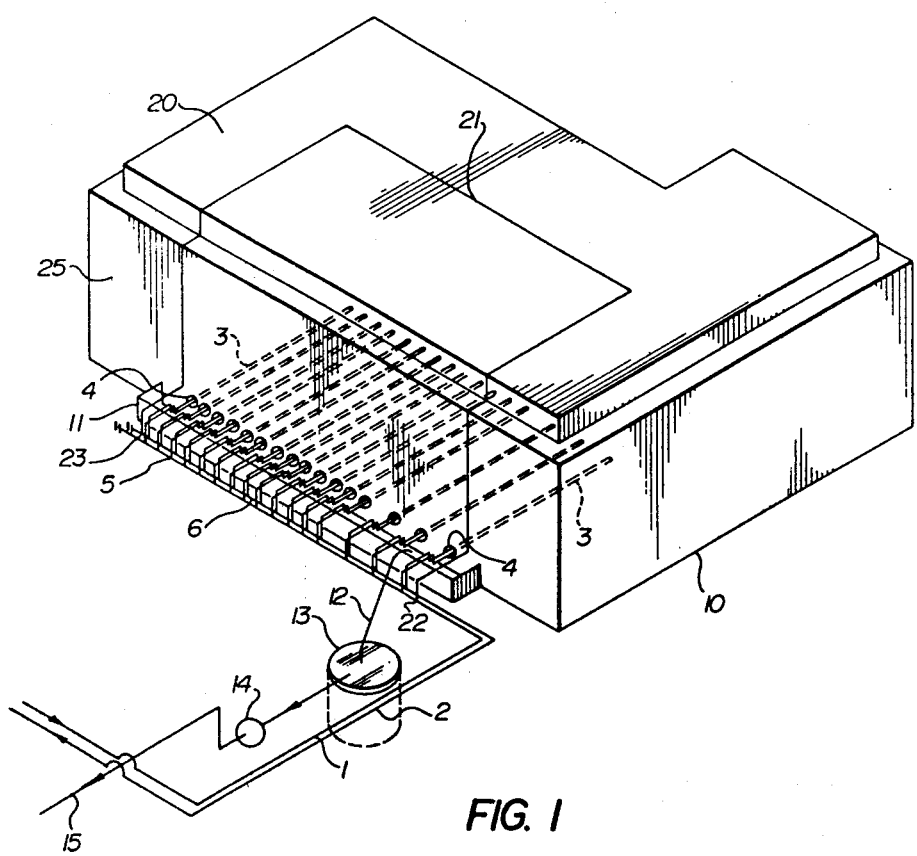
FIG. 1 is an isometric view of a representative free standing solid sulphur storage block with apparatus in position for in situ melting of a portion of the total block, collecting and removing the liquid sulphur.

Referring to FIG. 1, sixteen bore holes 4, each fifty feet in length, substantially horizontal and parallel to each other, are augered into a free standing solid sulphur storage block 10. Each hole 4 is about ten inches in diameter and is located at a height of about eighteen inches from the base of the block which is at ground level. The first thirteen holes, looking from left to right, are substantially equi-spaced with a center to center spacing between adjacent holes of about two feet while the last four holes, looking from left to right, are again substantially equi-spaced but with a center to center spacing between each adjacent holes of about four feet.

A steam coil 3 in the form of a U-shaped element is placed in each bore hole 4. The U-shaped end of the pipe is placed within the bore hole in such a manner that approximately five feet of the open end of the steam coil 3 extends outwards from the outer face 25 of the storage block 10. Each steam coil 3 comprises two parallel lengths of pipe each 55 feet long and 2 inches in diameter. The two parallel pipes are connected at their one ends by a short radius "U" bend pipe to give a "U" shaped element or steam coil 3 about 55 feet long, with two open ends, one which serves as an inlet end and the other which serves as an outlet end.

The inlet ends of each of the steam coils 3 are connected together by means of a pipe forming a steam header 5 and the outlet ends of each of the steam coils 3 are connected together by means of a pipe forming a condensate header 6. The steam header 5 provides for heating of the steam coils 3 by conducting steam of suitable pressure from a central steam plant or other steam source via an ingoing steam pipe line 1 connected to the steam header 5. The condensate header 6 provides for the outlet of steam condensate from the steam coils 3 via the outlet end of each of the steam coils 3 through the condensate header 6 connected to an outgoing condensate pipe line 2 for return of condensate to the steam plant or source to be reheated for regeneration of steam. Each one of the steam coils 3 is fitted with a steam valve (not illustrated) located between the inlet steam header 5 and the inlet end of steam coil 3 and a steam trap (not illustrated) located between the outlet end of steam coil 3 and the condensate return header 6. Such an arrangement regulates the amount of steam passing through the steam coils 3, the rate of heating of the storage block 10 and the rate of melting of sulphur.

Alternatively, the steam coil 3 rather than being in the form of a U-shaped pipe, could be in the form of pairs of concentric pipes made, in this instance, from an inner pipe of about one inch diameter having an open front end and an open rear end and an outer pipe of about two inches diameter having an open front end and a closed rear end. The inner pipe is placed in the outer pipe with the open rear end of the inner pipe spaced from the closed rear end of the outer pipe in such a manner that the steam or other heating fluid which would be introduced into the inner pipe at its front end would flow through the inner pipe, exit at the rear end of the inner pipe and flow back along the annular opening between the inner and outer pipes to the open end of the outer pipe. The open end of the inner pipe could be connected to the steam header 5 and the annular opening between the inner and outer pipes would be connected to the condensate header 6 or vice versa. The concentric pipes are inserted into the holes augered into the storage block, and in this instance the holes would have a diameter of about three inches. The concentric pipes would be located within the block in a substantially horizontal position, parallel to each other and could have varying center to center spacing between adjacent pipes.

The steam coils 3 rather than all being of the same length as illustrated in FIG. 1 could be of different lengths. When the coils are then placed in the block of sulphur, coils of different lengths would be placed to suit block dimensions or accomodate melting or removal of liquid sulphur.

A weir 11 is constructed in front of the holes 4 and is located alongside the base of the storage block 10. The weir 11 encloses the area bounded by the ground alongside the base of the storage block 10 and that part of the face of the storage block 10 from the ground upwards. A suitable weir, in this instance, may enclose a storage volume measuring 18 inches wide, 24 inches high and 45 feet long. The weir 11 acts as a collecting container for the liquid sulphur when it melts and flows from the storage block 10 as a result of heat supplied by the steam coils 3. The weir 11 in combination with an overflow pipe 12 is effective during the melting of the sulphur, to retain a roughly constant level of liquid sulphur in the weir 11. This volume of liquid sulphur in the weir 11 totally immerses the inner and outer ends of the steam coils 3 and thus acts as a heat transfer medium between the steam coils 3 and the solid sulphur at or near to the base of the storage block 10. The overflow pipe 12 connects the upper part of the weir 11 to a liquid sulphur holding tank 13 buried in the ground about 20 feet from the base of the storage block 10. The depth of the overflow pipe 12 inside the weir 11 is so arranged that when liquid sulphur collects in the weir 11 from the storage block 10, the depth of liquid sulphur retained in the weir 11 is maintained in this instance, at about 12 inches and thereafter, excess liquid sulphur flows from the weir 11 via the overflow pipe 12 into the holding tank 13. A pump 14 pumps the liquid sulphur from the tank 13, when required, via the transfer pipe 15 to a suitable container for shipment or alternate disposal means.

If, as illustrated in FIG. 1, it is desired to melt only a portion of the block 10 a steam cutting coil 21 can be installed on the upper top surface 20 of the storage block 10 marking the perimeter of the upper top surface of the portion to be melted from the block 10. One end 22 of the steam cutting coil 21 is attached to ingoing steam pipe line 1 and the other end 23 of the steam cutting coil 21 is attached to outgoing condensate pipe line 2. Steam valves (not illustrated) are fitted at the ends 22 and 23 of the steam cutting coil 21. After the cutting coil 21 has been installed, high pressure steam is passed through the cutting coil 21 and the heated cutting coil 21 then melts the solid sulphur in the vicinity of the cutting coil 21. As the sulphur around the cutting coil 21 melts, the cutting coil 21 sinks downwards into the storage block 10. This operation continues until the cutting coil 21 reaches the base of the block 10 at ground level when the steam to the cutting coil 21 is then discontinued. At this point the inner portion has been separated or severed from the remainder of the storage block 10.

To melt the sulphur in the storage block 10, steam which may suitably be at a pressure up to 400 psig but preferably in the range of 30–70 psig is passed from the steam plant via the ingoing steam pipe line 1 and the steam header 5 to the steam coils 3. The solid sulphur of the block 10 in the immediate vicinity of the steam coils 3 melts and flows from the block 10 and is collected by the weir 11. When the volume of liquid sulphur in the weir 11 increases and the level of liquid sulphur reaches the mouth of the overflow pipe 12, the excess liquid sulphur then passes via the overflow pipe 12 to the liquid sulphur holding tank 13 where the liquid sulphur is stored in the liquid state until withdrawn via the transfer pipe 15. As the inner portion of the block 10 melts around the steam coils 3 and liquid sulphur flows into the weir 11, the inner portion begins to settle downwards in the front area adjoining or adjacent to the weir 11. As the base of the sulphur storage block melts away the entire block settles. A simple analogy to this melting and settling would be an ice cube on a hot plate. The rate of melting of sulphur in the inner portion is controlled by adjustment of the amount of steam supplied to the steam coils 3. For example, assuming constant area and heat transfer coefficients, the utilization of 50 psig steam would result in the transfer of about 30,400,000 BTU's per day which is equivalent to the remelting rate of 117 long tons of sulphur per day.

Figure 2:
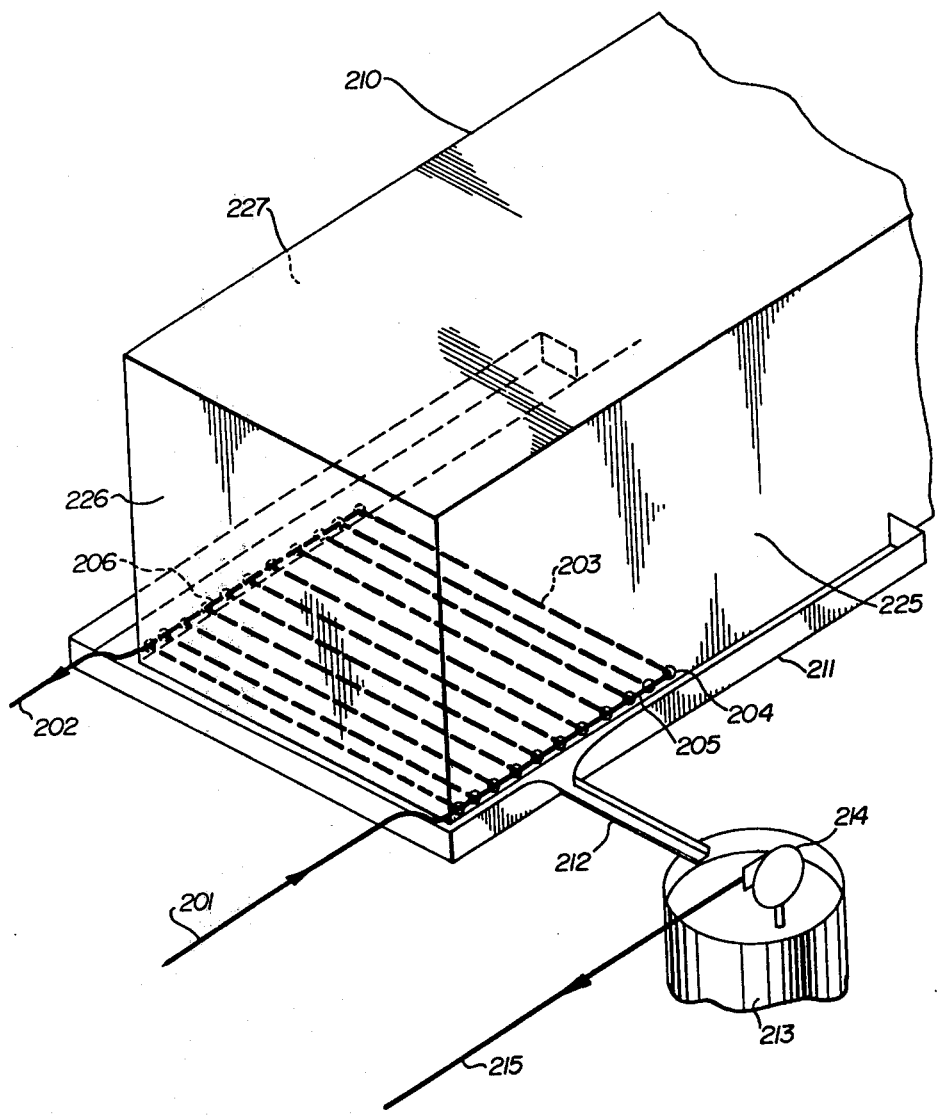
FIG. 2 is an isometric view of a representative free standing solid sulphur storage block with an alternative heating means comprising single pipe heating elements for in situ melting of the sulphur storage block.

FIG. 2 illustrates an alternative heating means for melting the sulphur from a free standing solid sulphur storage block 210. Bore holes 204 having a diameter of three inches are augered into the storage block 210 and extend between opposite sides of the storage block 210. The bore holes 204 are in a substantially horizontal position and parallel to each other. Although the bore holes 204 in FIG. 2 have substantially equal center to center spacing the bore holes may have varying center to center spacing. A steam coil 203 in the form of a single pipe is placed in each bore hole 204. The inlet ends of each of the steam coils 203 are connected together by means of a pipe forming a steam header 205 and the outlet ends of each of the steam coils 203 are connected together by means of a pipe forming a condensate header 206. The steam header 205 is connected to an ingoing steam pipe line 201 and the condensate header 206 is connected to an outgoing condensate pipe line 202. A weir 211 constructed similar to weir 11 illustrated in FIG. 1 extends along one side 225 of the storage block 210 in front of the holes 204, around the side 226 of the storage block 210 to extend along the opposite side 227 of the storage block 210 in front of the holes 204. An overflow conduit 212 connects the weir 211 to a liquid sulphur holding tank 213. A pump 214 pumps the liquid sulphur from the tank 213, when required, via a transfer pipe 215 to a suitable container for shipment or alternate disposal means.

It will be understood that although the apparatus and method of the invention has hereinbefore been described and illustrated in the drawings with reference to particular embodiments, those skilled in the art will be familiar with, and will appreciate that, variations can be introduced in the apparatus and the method while still remaining within the embodiments of this invention.

We claim:

1. A method for the in situ melting and recovery of sulphur from a free standing solid block of stored sulphur having a generally horizontal base, which comprises drilling a series of generally horizontal bores adjacent the base of the block and inserting a series of elongated heat exchange elements into said bores to provide a generally horizontal array of said elements, providing a weir adjacent the base of the block in such position as to allow a layer of molten sulphur to be retained in contact with said elements, supplying heat to said elements to cause sulphur in contact therewith to melt and form said molten layer, and removing molten sulphur from said weir at a rate sufficient to maintain said molten layer in contact with said elements.

2. A method according to claim 1, wherein said heat exchange elements are U-tubes supplied with heated fluid.

3. A method according to claim 1, wherein said heat exchange elements are pairs of concentric tubes supplied with heated fluid.

4. A method according to claim 1, including an initial step of separating a portion of said sulphur block to be metled from the remainder of said block by means of a heated cutting element, said bores being drilled into said portion and said weir being provided against the outer wall of said portion.

5. The method as defined in claim 1 wherein the heat exchange elements are parallel to each other and are all located at substantially the same height from the base of said block.

6. The method as defined in claim 1 wherein the heat exchange elements are parallel to each other and are located at at least two different heights from the base of the storage block.

7. The method as defined in claim 1 wherein all the heat exchange elements extend the same distance into the storage block from the outer surface of the storage block.

8. The method as defined in claim 1 wherein the heat exchange elements extend at least two different distances into the storage block from the outer surface of the storage block.

9. The method as defined in claim 1 wherein the heat exchange elements are arranged with a substantially equal center to center spacing between adjacent elements.

10. The method as defined in claim 1 wherein the heat exchange elements are arranged with a substantially equal center to center spacing between some adjacent elements and variable center to center spacing between other adjacent elements.

11. The method as defined in claim 1 wherein said heat exchange elements are heated by fluid heat means.

12. The method as defined in claim 1 wherein said heat exchange elements are heated by gaseous heat means.

13. The method as defined in claim 1 wherein said heat exchange elements are heated by steam.

14. The method as defined in claim 1 wherein said heat exchange elements are heated by liquid heat means.

15. The method as defined in claim 1 wherein said heat exchange elements are heated by hot oil or glycol.

16. A method for storage and recovery of sulphur, comprising the steps of pouring molten sulphur onto a generally flat base area to form a free standing storage block, and recovering the sulphur in molten form by drilling a series of generally horizontal bores adjacent the base of the block and inserting a series of elongated heat exchange elements into said bores to provide a generally horizontal array of said elements, providing a weir adjacent the base of the block in such position as to allow a layer of molten sulphur to be retained in contact with said elements, supplying heat to said elements to cause sulphur in contact therewith to melt and form said molten layer, and removing molten sulphur from said weir at a rate sufficient to maintain said molten layer in contact with said elements.

17. Apparatus for the in situ melting of sulphur and removal of liquid sulphur from a solid sulphur storage block which comprises a horizontal array of heating elements arranged near the base of said block and means for supplying heat to said elements for heating and melting the sulphur in the storage block close to said elements to produce liquid sulphur, and a weir for collecting the liquid sulphur and means for removing the liquid sulphur from the weir, said weir and removal means being arranged so that sulphur melted by said heating elements forms a layer in contact with said heating elements.

18. The apparatus as defined in claim 17 wherein the heat exchange elements are elongated tubular elements having an inlet and an outlet for a heating fluid.

* * * * *